United States Patent [19]

Zinnai

[11] 4,277,047

[45] Jul. 7, 1981

[54] METALLIC SEALING DEVICE FOR VALVE

[75] Inventor: Sadazi Zinnai, Yokohama, Japan

[73] Assignee: Tokyo Koso Kabushiki Kaisha, Saitama, Japan

[21] Appl. No.: 116,248

[22] Filed: Jan. 28, 1980

[30] Foreign Application Priority Data

Jan. 30, 1979 [JP] Japan .................................... 54-8780

[51] Int. Cl.3 ............................................... F16K 25/00

[52] U.S. Cl. ..................................... 251/362; 251/174; 277/236

[58] Field of Search ............... 251/174, 306, 173, 362; 277/12, 138, 151, 236

[56] References Cited

U.S. PATENT DOCUMENTS

| | | | |
|---|---|---|---|
| 3,077,331 | 2/1963 | Burtis | 251/173 |
| 3,156,445 | 11/1964 | Swain | 251/171 |
| 3,197,174 | 7/1965 | Killian | 251/362 X |
| 3,208,718 | 9/1965 | White | 251/172 |
| 3,335,999 | 8/1967 | Lowrey | 251/362 X |
| 3,394,915 | 7/1968 | Gachot | 251/174 |
| 3,544,066 | 12/1970 | Fawkes | 251/306 |

FOREIGN PATENT DOCUMENTS

| | | | |
|---|---|---|---|
| 2605189 | 8/1976 | Fed. Rep. of Germany | 251/306 |
| 131003 | 3/1975 | Norway | 251/173 |
| 383104 | 12/1964 | Switzerland | 251/174 |
| 1305554 | 2/1973 | United Kingdom | 251/306 |

*Primary Examiner*—Robert S. Ward, Jr.
*Attorney, Agent, or Firm*—Stevens, Davis, Miller & Mosher

[57] ABSTRACT

A metallic sealing device for a valve including a fluid passage therein and an inner valve positioned in said fluid passage, which comprises an annular groove having nearly T-shape in section formed around the fluid passage by the valve body and a metallic seat holder fixed thereto and a metallic seat arranged in said annular groove and partially projecting into the fluid passage. The metallic seat consists of a metallic sheet having shoulders formed at the sides to limit the projection of the seat into the fluid passage and an extension of one of said sides extending, in the nearly T-shaped groove at the part opposite to the fluid passage toward the other of said sides, thereby promoting the fluid sealing property as well as elastic property of the metallic seat itself and nullifying the dependency of the sealing property on the fluid flowing direction to utilize the function of the fluid pressure at the time of shutting off the fluid passing through the fluid passage. The metallic seat is formed by press-forming of a single sheet metal, without applying other machining process, and it contacts at its projecting end with the inner valve, thereby achieving superior fluid shut-off performance, good durability, easy machinability or the other advantages by the metal-to-metal contact without using synthetic resin or rubber.

1 Claim, 4 Drawing Figures

METALLIC SEALING DEVICE FOR VALVE

BACKGROUND OF THE INVENTION

The present invention relates to a sealing device for a valve of metal-to-metal contact type which is used to shut off fluid such as high-temperature fluid, high-pressure fluid or slurry fluid containing iron particles therein in which sealing means made of synthetic resin or synthetic rubber cannot be employed.

SUMMARY OF THE INVENTION

It is an object of the present invention to provide a sealing device for a valve of this kind, in which a metallic seat, which constitutes a most important part for shutting off the fluid, has elasticity owing to its special shape and special manner of forming, whereby the leakage of fluid at the time of shut-off is held at minimum, and in which the wear at the metal-to-metal contact surface is decreased, the durability is improved and the initial performance can be maintained for a long period.

It is another object of the present invention to provide a sealing device for a valve in which the metal-to-metal contact pressure is increased by utilizing the pressure of fluid at the time of shut-off of the fluid and the same fluid shut-off performance of the high-pressure fluid as that of the low-pressure fluid is obtained owing to the balance of the fluid shut-off pressure relative to that applied to the contact surface.

In accordance with the present invention there is provided a metallic sealing device for a valve including a fluid passage therein and an inner valve positioned in said fluid passage, which comprises an annular groove having nearly T-shape in section formed around the fluid passage by the valve body and a retainer of the metallic seat fixed thereto and a metallic seat arranged in said annular groove and partially projecting into the fluid passage, said metallic seat comprising a metallic sheet having a projecting part for contacting with the inner valve, shoulders formed at the sides thereof to limit the projection of said seat into the fluid passage and an extension of one of said sides extending in the nearly T-shaped groove at the part opposite to the fluid passage toward the other of said sides, thereby promoting the fluid sealing property as well as the elastic property of the metallic seat itself and nullifying the dependency of the sealing property thereof on the fluid flowing direction to utilize the function of the fluid pressure at the time of shutting off the fluid passing through the fluid passage, said metallic seat being formed by press-forming of a single sheet metal, without applying other machining process, thereby achieving superior fluid shut-off performance, good durability, easy machinability or other advantages by the metal-to-metal contact without using synthetic resin or rubber.

BRIEF DESCRIPTION OF THE DRAWINGS

The accompanying drawings illustrate an embodiment of the present invention, in which.

PREFERRED EMBODIMENT

Figure 1:
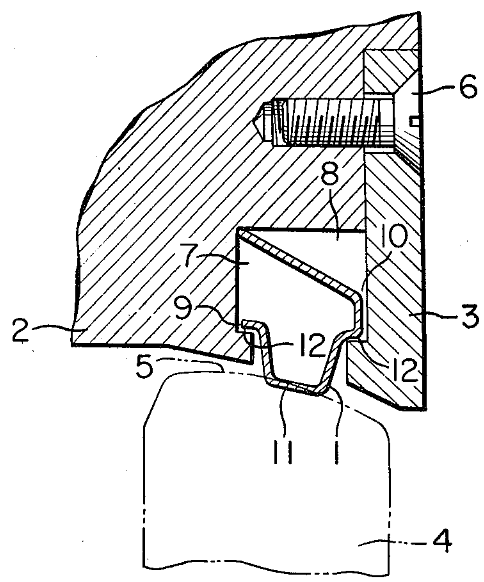
FIG. 1 is a partial enlarged sectional view of an embodiment of the metallic sealing device for valve according to the present invention, showing the state of the main parts thereof where the inner valve for shutting off the fluid does not act against the sealing device.

The invention will be explained with reference to an embodiment of the metallic sealing device for valve according to the present invention which is shown in FIGS. 1–4.

In FIGS. 1–4, 1 is a metallic seat, 2 is a valve body, 3 is a retainer of the metallic seat, 4 is an inner valve for shutting off the fluid, 5 is an inclined seating surface arranged to come into contact with the metallic seat 1 to shut off the fluid, 6 is a screw for fixing the metallic seat retainer 3 onto the valve body 2, 7 is a fluid pressure introducing A chamber defined by the valve body 2 and the metallic seat 1, 8 is a fluid pressure introducing B chamber defined by the valve body 2, the metallic seat retainer 3 and the metallic seat 1, 9 is a clearance for introducing the fluid pressure of the passage into the fluid pressure A introducing chamber 7, and 10 is a clearance for introducing the fluid pressure of the passage into the fluid pressure introducing B chamber 8.

The metallic seat 1 will be explained more in detail. A groove having nearly T-shape in section is formed in the valve body at right angle to the passage. The metallic seat 1 mounted in said groove comprises an inclined contact surface 11 corresponding to the inclined seating surface of the inner valve 4 and forming the area to be contacted with the latter, shoulders 12 formed at the sides of said inclined contact surface to limit the projection of the seat into the fluid passage, and an extension of one of the sides of said inclined contact surface extending, at the part opposite to the fluid passage, diagonally across the nearly T-shaped groove to define the fluid pressure introducing A chamber 7 and the fluid pressure introducing B chamber 8, said extension tightly contacting, at the forward end thereof, with the valve body 2 to hold the amount of the fluid moving between these fluid pressure introducing chambers at minimum or zero, whereby the contact surface pressure between the inclined seating surface 5 of the inner valve 4 and the inclined contact surface 11 of the metallic seat 1 at the fluid shut-off time is increased and the back-up force is produced by utilizing the fluid pressure to promote the fluid shut-off performance.

In the embodiment as shown in FIG. 1, the nearly T-shape groove is formed at right angle to the fluid passage, but it may be formed in the inner valve 4 at right angle to the inclined seating surface 5.

In the embodiment as shown in FIG. 1, the clearances 9 and 10 are formed as fluid passages communicating with the fluid pressure introducing A and B chambers. However, in case where the annular side surfaces of the metallic seat 1 are to be tightly contacted with the valve body 2 and the metallic seat retainer 3, respectively, a plurality of recessed portions of V-shape or the like may be formed in the annular side surface of the metallic seat 1, instead of the clearances, with the same result.

Figure 3:
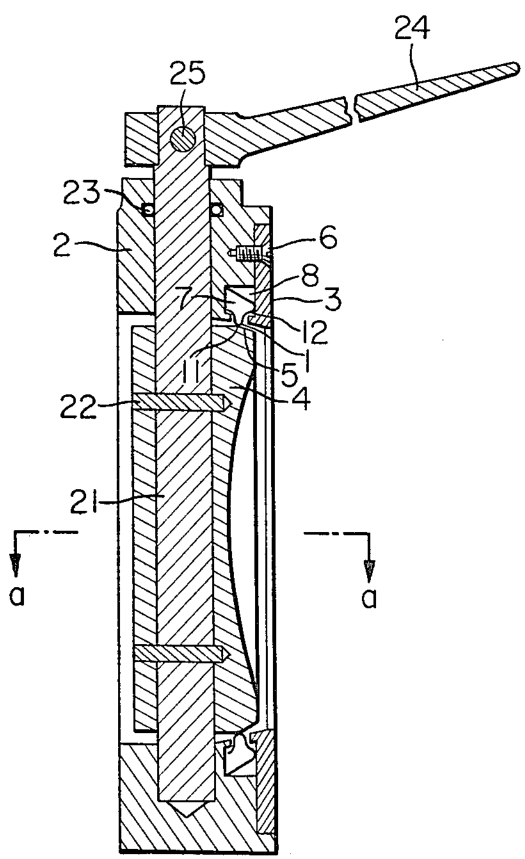
FIG. 3 is a sectional view of a butterfly valve using the metallic sealing device according to the present invention.
Figure 4:
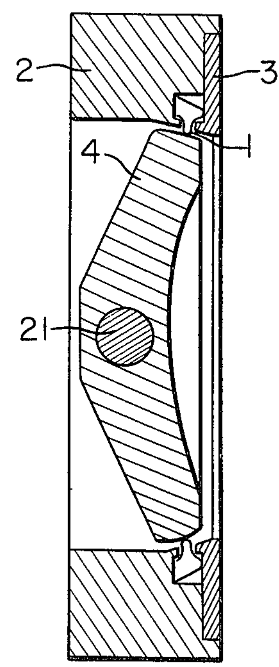
FIG. 4 is a sectional view along the line a—a of FIG. 3.

In FIGS. 3 and 4, 21 is a valve stem inserted into a hole formed in the inner valve 4, supported in a hole formed in the valve body 2 and projecting outward of the valve body 2, 22 is a pin for fixing the valve stem and the inner valve 4 with each other, 23 is a seal ring for preventing the fluid from leaking outward of the valve body 2, 24 is a lever-handle for manually rotating the inner valve 4 to open or close the passage or to adjust the passage to a desired degree, and 25 is a pin for fixing the lever-handle 21 and the valve stem 21.

In this embodiment, the metallic sealing device according to the present invention is arranged at the side of the valve body 2, but it may be arranged at the side of the inner valve 4, with the same function.

The invention is not limited to the above embodiments but may be modified and applied in various ways.

The valve body 2 is, of course, mounted between flanges of pipes, not shown in the drawings.

The function of the metallic sealing device for valve according to the present invention will be explained with reference to FIGS. 1 and 2.

It is assumed that the metallic sealing device according to the present invention is arranged as shown in FIG. 1 and the valve element 4 for shutting off the fluid passage is manually operated or automatically operated by means of pneumatic, hydraulic, electric or other automatic actuator to the fluid shut-off position, thereby causing the inclined contact surface 11 of the metallic seat 1 to come into contact with the inclined seating surface 5 of the inner valve 4. By this function, the metallic seat 1 is urged in the direction opposite to fluid passage, while the reaction is produced, so that the contact surface pressure between the inclined contact surface 11 and the inclined seating surface 5 is increased, thereby shutting off the fluid and holding the amount of leakage into the downstream side at minimum.

When the inner valve 4 is moved to the passage opening position, that is, the inclined seating surface 5 is moved away from the inclined contact surface 11 of the metallic seat 1, the metallic seat 1 returns to the position shown in FIG. 1 by the self-elasticity thereof owing to the special feature of the press-forming of sheet metal.

In the metallic sealing device according to the present invention, the fluid pressure of the fluid passage is utilized, in addition to the above-mentioned function, is utilized, so that the contact surface pressure is increased over the above-mentioned self-elasticity, and thus the stable function can be maintained over the range from the low pressure fluid to the high pressure fluid.

The utilization of the fluid pressure will be explained with reference to the state where the inner valve 4 of FIG. 2 closes the fluid passage.

Figure 2:
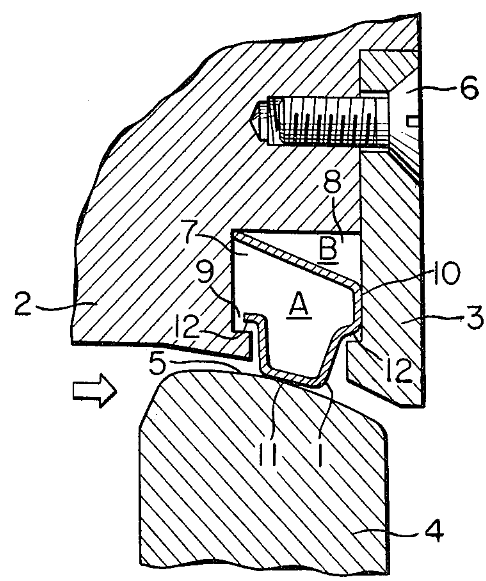
FIG. 2 is a partial enlarged sectional view showing the state of the main parts where the inner valve for shutting off the fluid acts against the sealing device to shut off the fluid passage.

It is assumed that the fluid flows in the direction indicated by the arrow in FIG. 2. The fluid pressure of the passage passes to the fluid pressure introducing A chamber 7 through the clearance 9, to cause the metallic seat 1 to be pressed against the inclined seating surface 5 of the inner valve 4, the metallic seat retainer 3 and the valve body 2, and consequently the contact surface pressure between the inclined seating surface 5 of the inner valve 4 and the inclined contact surface 11 of the metallic seat 1 as well as the contact surface pressure between the forward end opposite to the inclined contact surface 11 of the metallic seat 1 and the valve body 2 can be increased. Referring to the pressing force acting against the contact surface between the inclined seating surface 5 of the inner valve 4 and the inclined contact surface 11 of the metallic seat 1, in the area from the fluid inlet side to the average central position of the contact surface, the fluid pressure at the side of the fluid passage and that at the side of the fluid pressure introducing A chamber 7 are cancelled with each other and in the area at the downstream side of said average central position the difference between the fluid pressure at the downstream side and the fluid pressure in the fluid pressure introducing A chamber 7 acts on the metallic seat 1 in the area downstream of said average central portion of the contact surface, so that abnormal force cannot occur and the balance between the pressing force and the fluid pressure can be obtained.

If the fluid flowing direction is reversed, the pressure introducing B chamber 8 becomes into action, with the same effect.

On the reasons as described above, the present invention provides a metallic sealing device in which a seat made of a thin metallic sheet, which has only small elastic property, can keep its initial performance for a long period, without causing permanent deformation. It provides superior sealing performance which is inferior but near to that obtained by a sealing device using synthetic resin or rubber at the seat area thereof, that is, it enables to hold the amount of leakage of fluid to minimum value, such as 1/1000 or lower, which is considerably lower than that obtained by the conventional valve of this kind having metal-to-metal contact. Furthermore, the present invention provides a high-performance metallic sealing device which is adaptable to any type of fluids, such as low to high temperature fluids, low to high pressure fluids, and pure water to slurry fluids.

I claim:

1. A metallic sealing device for a valve including a fluid passage therein and an inner valve positioned in said fluid passage, which comprises an annular groove having nearly T-shape in section formed around the fluid passage by the valve body and a metallic seat retainer fixed thereto and a metallic seat arranged in said annular groove and partially projecting into the fluid passage, said metallic seat comprising a metallic sheet having a projecting part for contacting with the inner valve, shoulders formed at the sides thereof to limit the projection of said seat into the fluid passage and an extension of one of said sides extending in the nearly T-shaped groove at the part opposite to the fluid passage toward the other of said sides, thereby promoting the fluid sealing property as well as elastic property of the metallic seat and nullifying the dependency of the sealing property thereof on the fluid flowing direction to utilize the function of the fluid pressure at the time of shutting off the fluid, said metallic seat being formed by press-forming of a single sheet metal.

* * * * *